UNITED STATES PATENT OFFICE.

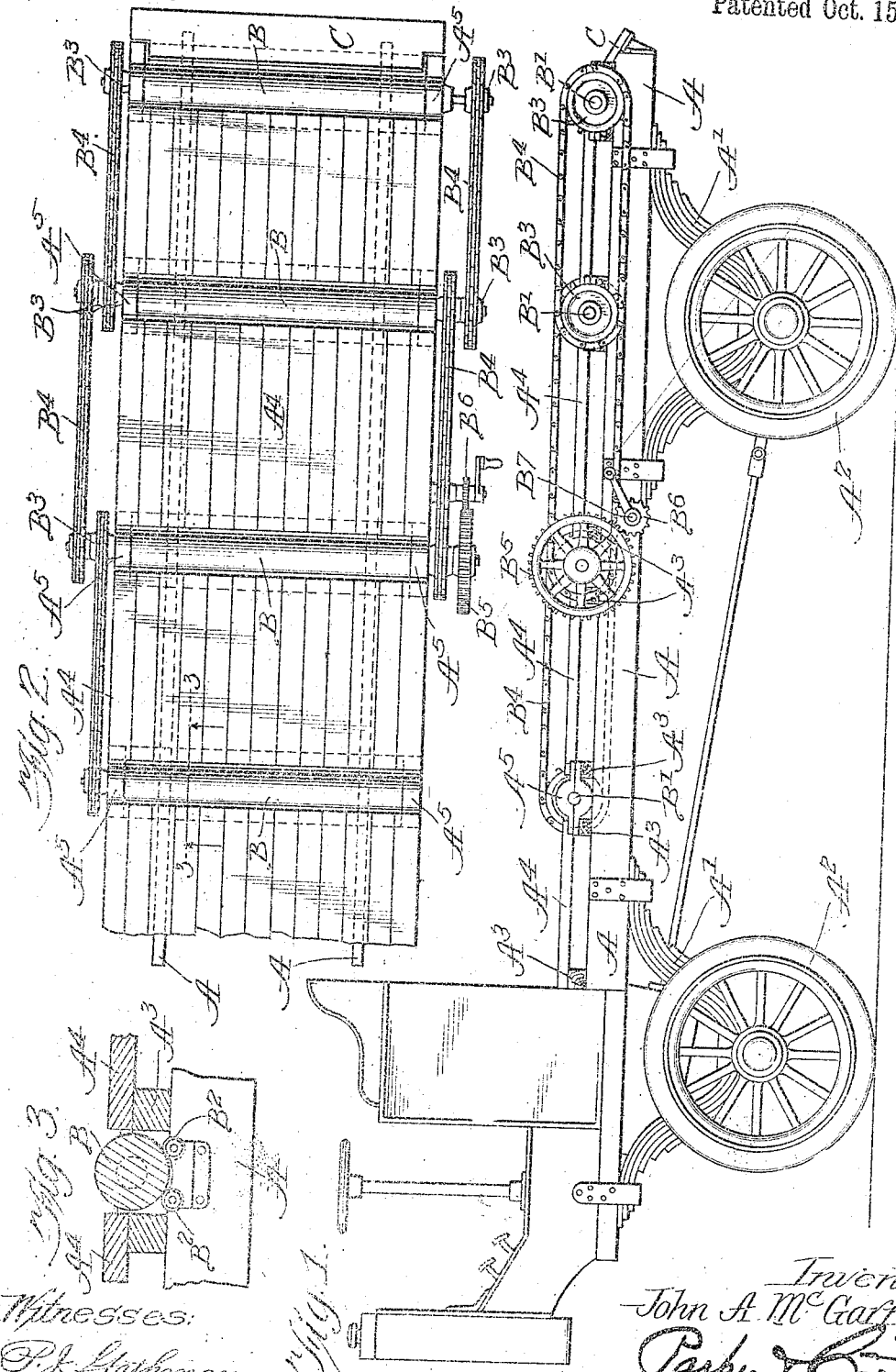

JOHN A. McGARRY, OF CHICAGO, ILLINOIS.

LUMBER-TRUCK.

1,041,319.

Specification of Letters Patent.

Patented Oct. 15, 1912.

Application filed January 11, 1911. Serial No. 601,955.

*To all whom it may concern:*

Be it known that I, JOHN A. MCGARRY, a citizen of the United States, residing at Chicago, in the county of Cook and State of Illinois, have invented a certain new and useful Improvement in Lumber-Trucks, of which the following is a specification.

My invention relates to improvements in trucks or loading platforms and the like, and is illustrated diagrammatically in one form in the accompanying drawing, wherein—

Figure 1 is a side elevation, Fig. 2, a plan view, Fig. 3, a detailed section along the line 3—3 of Fig. 2.

Like parts are indicated by like letters in all the figures.

The main frame A which may be mounted on the springs $A^1$ and wheels $A^2$ of an automobile truck as indicated, carries the transverse members $A^3$ arranged in parallel pairs supporting the platform $A^4$ and carrying between their ends the bearings $A^5$. The rollers B are located between adjacent members $A^3$ are mounted upon the shafts $B^1$ and are supported intermediate their ends by the rollers $B^2$ and at their ends by the bearings $A^5$ which support the shafts $B^1$. The shafts $B^1$ are provided at either end with the sprockets $B^3$ carrying the chains $B^4$ and one end of one of the shafts $B^1$ carries the gear $B^5$ in engagement with the pinion $B^6$ on the crank shaft $B^7$. The platform terminates at one end in one of the rollers B on the other side of which is located the rearwardly and downwardly extending apron C which extends outwardly and downwardly beyond the end of the main frame A.

It will be evident that while I have shown in my drawing an operative device, still many changes might be made in size, shape and arrangement of parts without departing materially from the spirit of my invention. For instance, the platform might be mounted upon an ordinary wagon truck or even upon fixed supports and I wish therefore, that my drawings are regarded as in a sense diagrammatic.

The use and operation of my invention are as follows: Material such as lumber is loaded upon the truck or platform being supported by the rollers and held thereon in position and shape in the usual manner. When it is desired to tranship the load, the truck is backed up to a similar platform or is brought end to end with a similar wagon. The crank is then turned and the rollers are rotated and the entire load passes off intact on to the other set of rollers and there it may be locked in position and the truck will then operate in the usual manner. This process may be continued and transhipment without breakage of bulk may be made any number of times at the will of the operator. When the load is to be discharged upon the ground or any surface below the level of the truck platform, the rollers are operated until the load is carried backward to a point where it overbalances and one end falls upon the ground. The engine is then started and the wagon drawn from under the load, the load being supported by the rear roller of the wagon and the ground. As the rear roller passes forward to the end of the load, the end will leave the roller and slide down upon the downwardly inclined apron and be allowed to drop to the ground without damage to the wagon frame or platform.

It will be evident that in the case of rigid loads or materials the platform might be dispensed with but where light lumber is being carried the load is liable to sag between the rollers and if it does this, it will slide along the platform until it reaches the next roller and being guided by the platform will ride upwardly along its face.

The process above described, wherein a load of lumber or the like is trans-shipped in bulk from one platform to another, may, it is quite evident, be performed with any suitable apparatus, although preferably with the apparatus above indicated. It might be moved from one automobile truck to another, or from one automobile truck to a wagon or platform. One embodiment of my idea and the process is found in connection with lumber yards where gasolene propelled vehicles are not allowed to go. Where this is the case, the lumber would be loaded on a wagon identical with the one shown in my drawing, and would then be hauled to that part of the yard where the automobile truck was. The load would then be placed upon the truck by turning a crank to rotate the rollers and the automobile would deliver the load. Meanwhile the wagon would again be filled. Thus my invention resides both in the precise preferred form indicated and also in the process described.

I claim:

The combination with a truck of a slotted platform thereon, the slots in said platform being transversely disposed, load carrying rollers rotatably mounted on the platform supports and located in the slots, the upper edges of the rollers projecting slightly above the level of the platform, means for rotating one of said rollers and connecting means interposed between said driven roller and all the remainder to rotate them in unison, said rollers being supported at either end and at points intermediate their two ends.

JOHN A. McGARRY.

Witnesses:
  FRANCIS W. PARKER, Jr.,
  MINNIE M. LINDENAU.